AUDIO-VIDEO DISK RECORDING SYSTEM WITH CROSSTALK PREVENTION

Filed Dec. 26, 1963 4 Sheets-Sheet 1

INVENTORS:
Hugh F. Frohbach
Albert Macovski

By Smyth, Roston & Pavitt
Attorneys

AUDIO-VIDEO DISK RECORDING SYSTEM WITH CROSSTALK PREVENTION

Filed Dec. 26, 1963 4 Sheets-Sheet 2

INVENTORS:
Hugh F. Frohbach
Albert Macovski
By Smyth, Roston & Pavitt
Attorneys

AUDIO-VIDEO DISK RECORDING SYSTEM WITH CROSSTALK PREVENTION

Filed Dec. 26, 1963 4 Sheets-Sheet 3

INVENTORS:
Hugh F. Frohbach
Albert Macovski
By Smyth, Roston & Pavitt
Attorneys

Feb. 27, 1968 H. F. FROHBACH ET AL 3,371,154

AUDIO-VIDEO DISK RECORDING SYSTEM WITH CROSSTALK PREVENTION

Filed Dec. 26, 1963 4 Sheets-Sheet 4

INVENTORS:
Hugh F. Frohbach
Albert Macovski

By Smyth, Roston & Pavitt
Attorneys

United States Patent Office 3,371,154

Patented Feb. 27, 1968

3,371,154

AUDIO-VIDEO DISK RECORDING SYSTEM WITH CROSSTALK PREVENTION

Hugh F. Frohbach, Sunnyvale, and Albert Macovski, Palo Alto, Calif., assignors to Minnesota Mining and Manufacturing Company, St. Paul, Minn., a corporation of Delaware Filed Dec. 26, 1963, Ser. No. 333,285
14 Claims. (Cl. 178—5.6)

ABSTRACT OF THE DISCLOSURE

Composite video and audio signals are recorded on a disk along a spiral track in that during the horizontal blanking pulse periods the audio signals are recorded as carrier modulated signals with alternating carrier frequencies for sequential blanking pulses so that the recording of a blanking pulse is juxtaposed to recordings of blanking pulses, wherein the carrier frequencies for the audio signals differ.

This invention relates to a method and system for recording information such as video and audio information on a storage medium such as a disk, and to a method and system for reproducing such recorded information.

In recent years, systems have been devised which record high-frequency information on a storage medium and provide a subsequent reproduction of the information from the storage medium. For example, signals representing an image being viewed and the sound emanating from the environment of the image have been recorded on a magnetic tape. Also, signals have been recorded on storage media to represent different scientific and mathematical information, including the readings of instruments and the values obtained from computations performed by digital computers.

For the recording of high-frequency information, the systems now in use generally employ magnetic tapes as the storage medium. These tapes have proved fairly successful in recording signals representative of information and in obtaining the reproduction of the information. However, the magnetic structure of the tape limits the fidelity of the recording and reproduction, so that the magnetic tapes have to be manufactured with considerable precision. The information recorded on the magnetic tapes also has a limited density of information, so that a relatively great amount of tape is required to store information such as that required for a television program having a duration of one-half an hour or an hour. The limited density of information packing on the tape has resulted from limitations in the speed of response of the magnetic transducer heads which are disposed in contiguous relationship to the tape.

In the systems now in use, the transducer head is generally disposed adjacent to the tape to record information in magnetic form on the tape and to reproduce the magnetic information as electrical signals from the tape. The adjacent relationship between the transducer head and the tape occasionally causes the tape to rub against the head, so that magnetic particles become removed from the tape and are deposited on the head to affect the operation of the head. The magnetic particles on the tape tend to produce an abrasive action on the head, thereby permanently affecting the response characteristics of the head.

It is also difficult to use a magnetic tape as a master for the reproduction of a large quantity of identical tapes because of the wear on the tape and the adjacent heads and because of the considerable length of tape required for the master. It would, therefore, be more desirable to use disks as the master, since they tend to store information in a more compact form than tapes. However, the disk systems of the prior art have generally involved a groove cut in a disk of plastic material, with variation in the walls of the groove representing the electrical information.

The disk systems of the prior art have had certain important deficiencies. For example, the reproducing means has generally been in direct engagement with the disk. Actually, the reproducing means has constituted a needle which has contacted a groove in the disk to reproduce the information on the disk. This contact between the needle and the grooves has tended to wear the disk after the disk has been used several times.

It is an object of the present invention to provide a system which uses a disk as the storage medium and which is responsive to incoming information so as to vary the light-transmission characteristics of the disk in accordance with such information and to obtain a recording of the information on the disk. For example, the light-transmission characteristics of the disk are varied in a spiral track during the recording operation by an electron beam whose characteristics are controlled by signals representative of the incoming information. By way of illustration, the intensity of the electron beam may be varied by adjusting the potential on the grid of an electron gun in accordance with the characteristics of the information to be recorded. Since the electron beam is projected toward the disk from a position removed from the disk, no frictional forces are produced on the disk by the transducing action.

The information is being recorded on the disk in a spiral track having a constant pitch. A driving means is provided to move the disk along a radial line extending from the center of rotation of the disk. As the disk is moved along the radial line, the disk is also rotated at a constant speed past an electron beam which is maintained at a substantially constant position. The combination of the movement and rotation of the disk past the stationary electron beam produces a spiral track on the disk.

The driving means also includes a control of the radial movement of the disk relative to the beam, so that the information becomes recorded on the beam at a substantially constant rate.

Reproduction of the signals from the disk is accomplished by directing a light beam at the disk and by modifying the light beam in accordance with the light-transmission characteristics previously provided at successive positions on the spiral track on the disk. The modified light beam is detected to obtain a recovery of the information previously recorded on the disk. The information on the disk can be reproduced without having any members directly engage the disk. In this way, no wear is produced on the disk during the reproduction of the information on the disk.

It is another object of the present invention to record video and audio signals on the same disk.

Known recording systems operate in such a manner that video information is being recorded on and along a track running parallel to an audio track.

According to one aspect of the present invention in the preferred embodiment thereof, it is suggested to record an audio signal on the same track on which a video signal is recorded; however, the audio is being recorded within track portions allotted to record the horizontal blanking-pulse signals for the video information.

Since any one frame of the video signal is to be recorded along a track portion requiring precisely one revolution of the recording disk, the recorded sync and blanking signals occupy areas on the disk which are radially aligned. In order to avoid audio cross talk, it is thus a feature of the present invention to alternate between two carrier frequencies for audio signal modulation. Since the number of lines per frame is an odd number (525) and since there is an identical number of horizontal sync and blanking pulses, radially juxtaposed sync-pulse recordings thus contain audio information modulated at different carrier frequencies.

A similar result can be obtained if the audio carrier frequency is not being alternated from horizontal blanking or sync pulse to horizontal blanking or sync pulse, but from frame to frame. It is a further feature of the present invention to use the audio modulated sync-pulse range for control of tracking during play back of the record. For convenience, horizontal blanking pulses and horizontal sync pulses will, in the following description, be called horizontal control pulses. For reasons more fully explained below, audio signals can be recorded not only in the entire blanking period, but also, if desired, during the interval allotted to the sync pulse alone.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates somewhat schematically a block diagram for a circuit network controlling video and audio recording on a disk;

FIG. 1*a* illustrates a modified portion of the network shown in FIG. 1;

Figures 5, 5A, 5B:
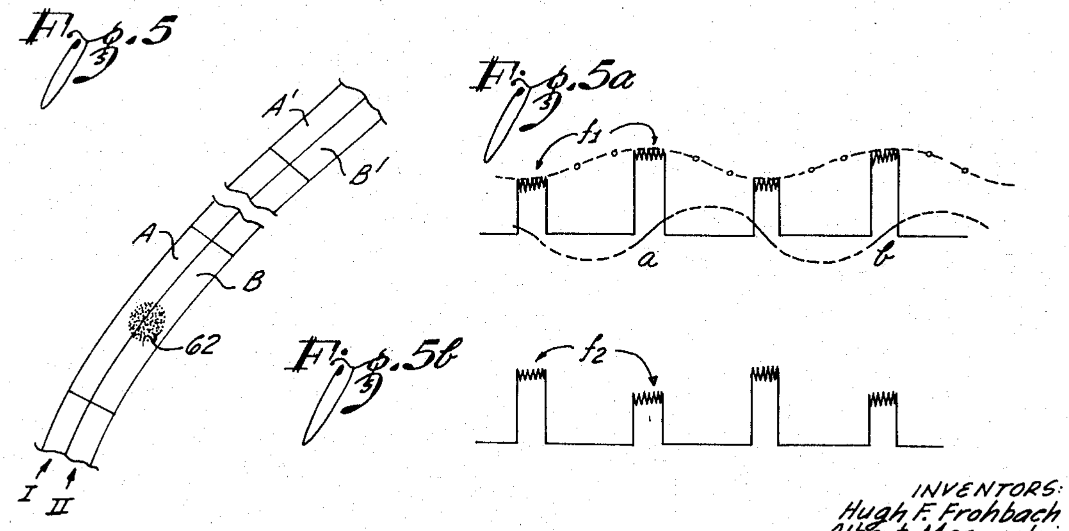
FIG. 5 illustrates a top view of a track portion of the recording disk with superimposed scanning light spot.
Figure 6:
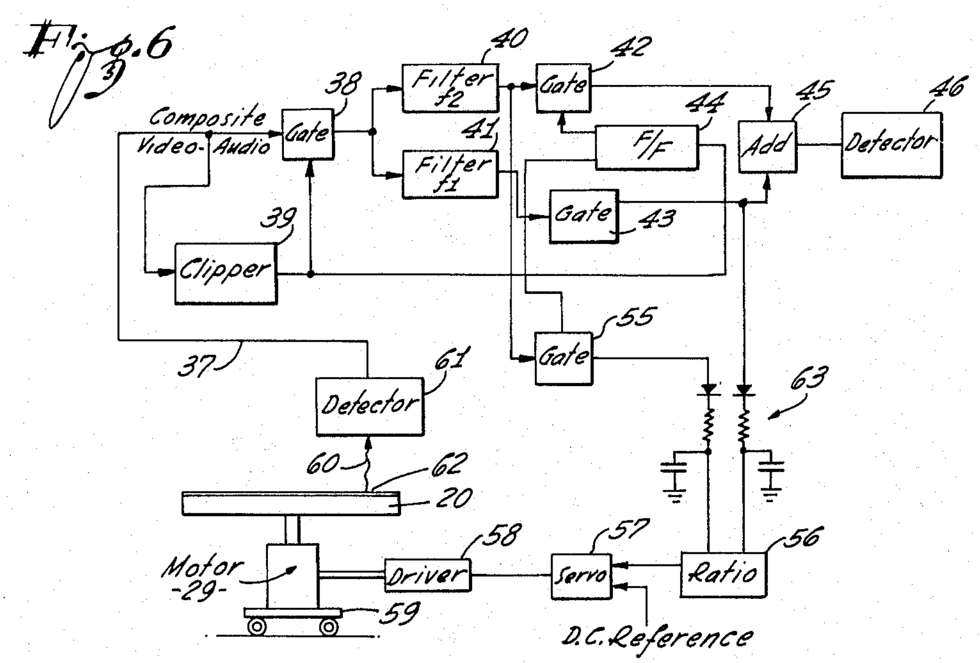
Figure 7:
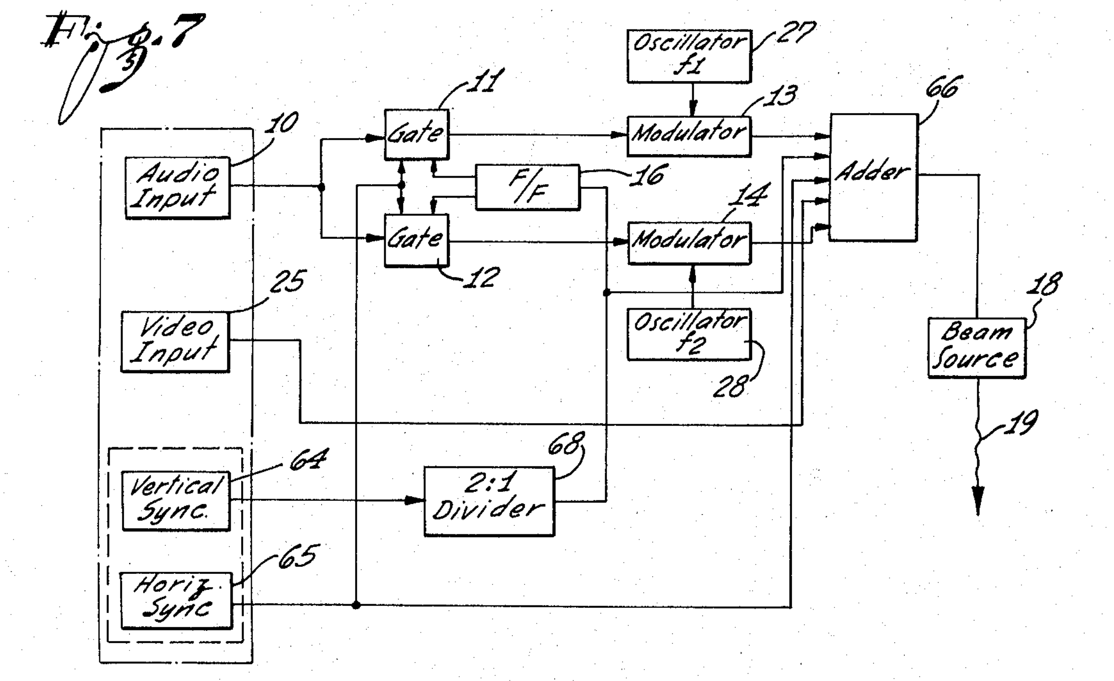
Figure 8:
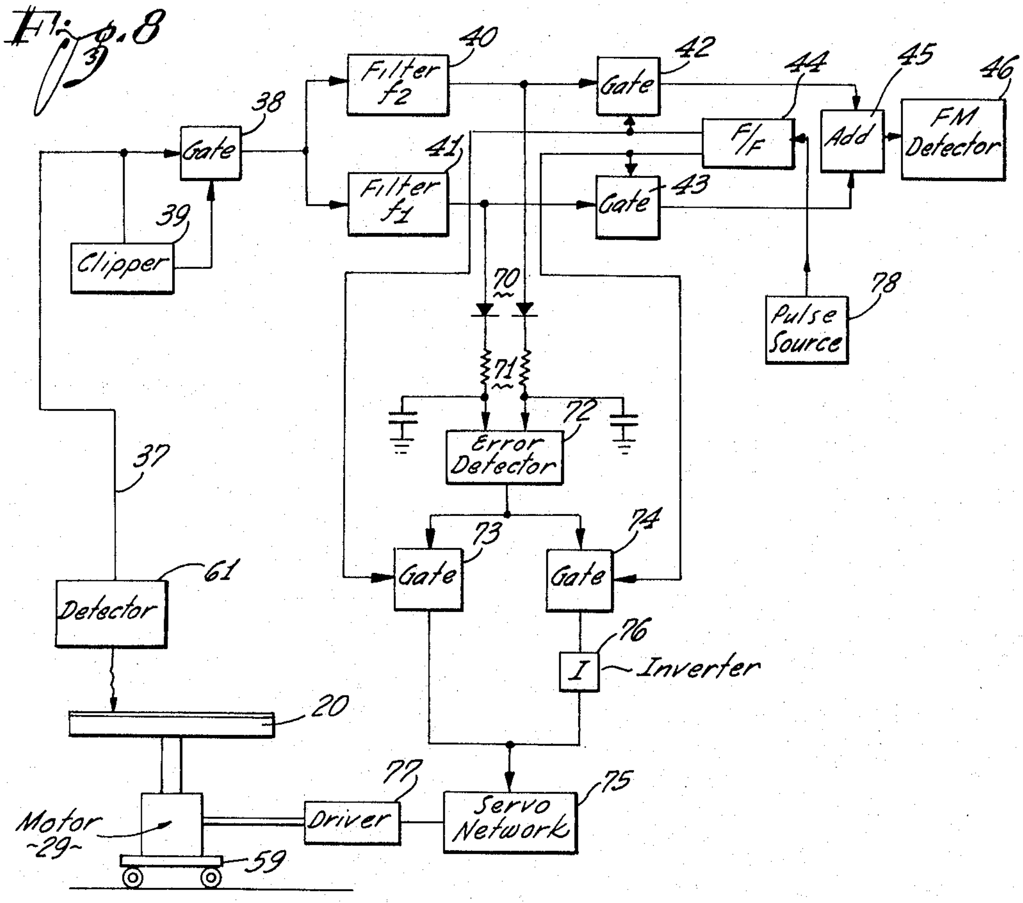

FIGS. 5*a* and 5*b* illustrate pulse diagrams plotted against time for developing tracking-control signals;

FIG. 6 illustrates somewhat schematically a modified block diagram for audio reproduction and tracking control;

FIG. 7 illustrates somewhat schematically a block diagram for a recording network with alternation of audio carrier frequency from frame to frame; and FIG. 8 illustrates a block diagram for audio reproduction and tracking of a recording disk having been recorded with the network shown in FIG. 7.

Figure 1:
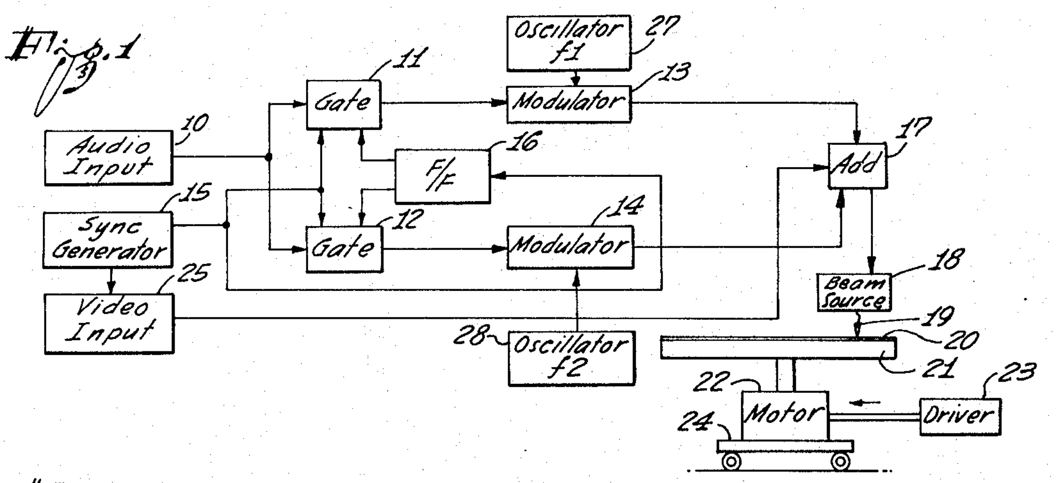

Proceeding now to the detailed description of the drawings, in FIG. 1 thereof, there is shown first an audio signal input source 10, which may, for example, comprise a microphone or a set of microphones. The electrical output signal produced by output source 10 is being fed to two gates 11 and 12, the respective output terminals of which connect to modulators 13 and 14. Modulator 13 is, furthermore, connected to a source of carrier frequency 27 such as an oscillator, and the carrier frequency produced may be designated "$f_1$." Accordingly, the modulator 13 will frequency-modulate the carrier $f_1$ with whatever audio signal is permitted to pass through gate 11. There is next provided a sync-pulse generator 15 of general design, feeding either the horizontal sync pulses or the horizontal blanking pulses, as the case may be, to a flip-flop 16 for triggering thereof. Flip-flop 16 is of the single-input type; that is to say, flip-flop 16 alternates between its two stable states upon occurrence of each horizontal control pulse applied thereto. The two output terminals of flip-flop 16 are respectively connected to gating terminals of gates 11 and 12. Accordingly, flip-flop 16 alternatingly opens and closes gates 11 and 12 upon occurrence of its trigger pulses. The horizontal control pulses, such as sync or blanking pulses, are additionally fed directly to a second input terminal of each gate 11 and 12 so that, respectively, one of these gates is being gated-open only for the duration of such a horizontal control pulse.

Figure 2:
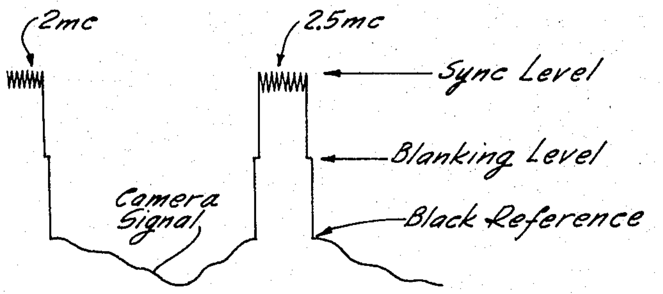
FIG. 2 illustrates the envelope of a composite video-audio signal as it will be recorded.

Alternatively, modulator 13 may be connected directly to the source of sync pulses 15. In particular, the connection between the sync-pulse generator 15 and modulator 13 may be such that the output signal of modulator 13 has a D.C. level equal to the level of the synchronization pulses (see FIG. 2).

Modulator 13 operates as frequency modulator because a constant amplitude level for the sync pulses is to be maintained.

The second modulator 14 is connected to an oscillator 28 producing signals at carrier frequency $f_2$. Accordingly, modulator 14 frequency-modulates the carrier frequency $f_2$ with whatever audio signal is permitted to pass through gate 12.

Modulator 14 may also receive sync pulses from source 15, so that the D.C. output level of modulator 14 is identical with that of modulator 13.

It thus appears that modulators 13 and 14 are operating alternatingly, and only for the duration of the blanking period corresponding to the horizontal sync or blanking pulses. It has been found suitable to employ, for example, as frequency $f_1$ a frequency of 2 megacycles, and as $f_2$ a frequency of 2.5 megacycles.

There is next provided an adding network 17 having respectively connected two input terminals to the output terminals of modulators 13 and 14. Since all information is to be recorded on a common track, adder 17 also receives the video input signal derived, for example, from a TV camera 25. The video input signal includes the blanking and synchronizing pulses as derived from generator 15.

During the blanking period, adder 17 thus receives the blanking and sync signals, which signals are combined with the audio-modulated carrier derived from modulator 13 or modulator 14. It should be mentioned that in case the entire horizontal blanking period is used for audio recording, the superpositioning of the sync pulse for recording is of little influence upon the fidelity of the audio. However, it is within the scope of the present invention to employ the period of the horizontal sync pulse alone, in which case the audio-modulated carrier appears superimposed only upon the sync-pulse level.

The composite output from adder 17 is fed to a source 18 providing a beam of energy 19, which is modulated in accordance with the output signal derived from adder 17.

Beam 19 inscribes recording information on a recording disk 20 seated on a turntable 21, which turntable is driven by a motor 22. The motor 22 together with turntable 21 may be mounted on a carriage 24, which is driven in a radial direction by a driver 23.

During recording, motor 22 rotates in synchronism with the occurrence of the vertical sync signals; and concurrently thereto driver 23 shifts the assembly 20, 21, 22, and 24 in a radial direction in relation to turntable 21 so that the beam 19 inscribes a spiral recording track on disk 20. A network for producing such spiral recording track is, for example, described in copending applications of W. R. Johnson et al., Ser. No. 192,930, filed May 7, 1962, and D. P. Gregg, Ser. No. 195,218, filed May 16, 1962, all assigned to the same assignee.

In its preferred form, as was outlined above, source 18 constitutes an electron gun, with beam 19 consisting of a beam of electrons focused upon recording disk 20. Recording disk 20 includes a photographic layer, so that the electron beam varies the light-transmission characteristics of the photographic layer in accordance with the strength of the signal momentarily delivered from adder 17 to source 18.

Figure 3:
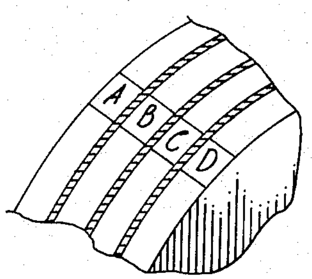
FIG. 3 illustrates a magnified portion of a top view of the recording disk shown in FIG. 1.

The recording is being carried out as follows. Starting out at any peripheral point on disk 20 and at the beginning of a particular frame, there will be produced the first horizontal control pulse signal actuating flip-flop 16 so that, for example, gate 11 is being opened for passage. The audio signals developed in source 10 are now permitted to pass through gate 11 and into modulator 13. Accordingly, the audio signal will frequency-modulate carrier $f_1$; the adder 17 thus furnishes a blanking or sync pulse having its blanking and/or sync levels frequency-modulated with a carrier of 2 megacycles, and this information is being inscribed upon a limited track portion on disk 20. It may be assumed that this recorded information occupies track area "A" on the track, as illustrated in FIG. 3. After recording, area "A" serves as a recording of a horizontal blanking pulse, including the recorded sync pulse, as well as an audio recording.

Sync and blanking-pulse source 15 provides for a necessary bias in the gates 11 and 12 connected ahead of the modulators so that, in the absence of any horizontal sync or blanking pulse, the modulators are, in effect, disabled. This way it is insured that no audio modulation occurs during time intervals in which video informaton is to be recorded. Thus, after decay of the controllng sync pulse, the adder 17 receives only video signals from camera 25.

The next horizontal control pulse, sync or blanking pulse, switches flip-flop 16 so as to close gate 11 and open gate 12. Accordingly, gate 12 permits the passage of audio signals into modulator 14 for the duration of such a control pulse, causing carrier $f_2$ to be frequency-modulated by this audio portion. The modulated signal, again at horizontal blanking- or sync-pulse level with constant amplitude, is fed to adder 17 to cause an audio modulated sync pulse to be inscribed on the track. Here, however, the recorded carrier frequency $f_2$ with audio modulation will be 2.5 megacycles.

The recording proceeds with the video signals being recorded in the usual manner, while successively occurring horizontal control pulses receive two different carriers of 2 megacycles and 2.5 megacycles, respectively. It should be mentioned that each horizontal sync pulse usually has a duration of 0.08 times the period corresponding to the line frequency so that a train of approximately ten to twelve carrier cycles appears during each sync pulse. The entire horizontal blanking period is about 0.14 to 0.18 times the line-frequency period, which is in the neighborhood of 10 microseconds, so that roughly twenty carrier cycles will appear during the blanking period. Since the horizontal sync pulses appear at a rate corresponding to a frequency of 15.75 kilocycles, it is possible to record up to 7.875 kilocycle audio information.

After one frame has been recorded or, in other words, after occurrence of 525 horizontal sync and blanking pulses, the disk has almost completed one revolution. The 526th blanking pulse will be recorded on the disk on a track portion occupying an area "B," which is radially aligned and juxtaposed to area "A." The audio inscribed in track portion "A" has as a carrier frequency 2 megacycles, while the carrier for the audio recording in area "B" is 2.5 megacycles. It, therefore, appears that if the audio of area "A" is being sampled for a frequency of 2 megacycles, the area "B" cannot influence the sampling process, since area "B" contains only a carrier recording for 2.5 megacycles.

In FIG. 3, there are shown four parallel track portions with radially aligned blanking-pulse recordings "A, B, C, and D." Areas "A" and "C" contain audio recordings at a carrier frequency $f_1$, while areas "B" and "D" have audio recordings at carrier frequency $f_2$.

Figure 1A:
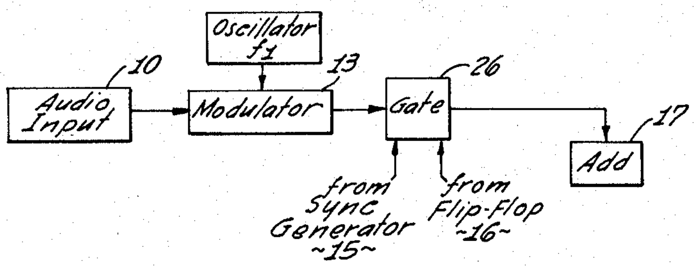

Turning now briefly to FIG. 1*a*, it will be understood that the gate 11 does not have to be provided ahead of modulator 13 as far as the flow of audio signals is concerned. It is quite possible, without changing the results obtained, to apply the audio signals directly and continuously to both modulators 13 and 14 and to have the outputs of the modulators governed by gates. Specifically, FIG. 1*a* shows that modulator 13 is directly connected to audio input 10, while a gate 26 is interposed in the connection between the output of modulator 13 and the one input terminal of adder 17. The gate 26 is controlled in precisely the same manner as is gate 11 in FIG. 1.

Finally, it should be mentioned that gating networks may be provided in the connection between the modulators and their respective carrier sources. In either case, such gates will be controlled by appropriate flip-flops governing the modulation process in such a manner that adder 17 receives audio-modulated carriers of alternating frequency and occurring during the horizontal sync or blanking pulse.

Figure 4:
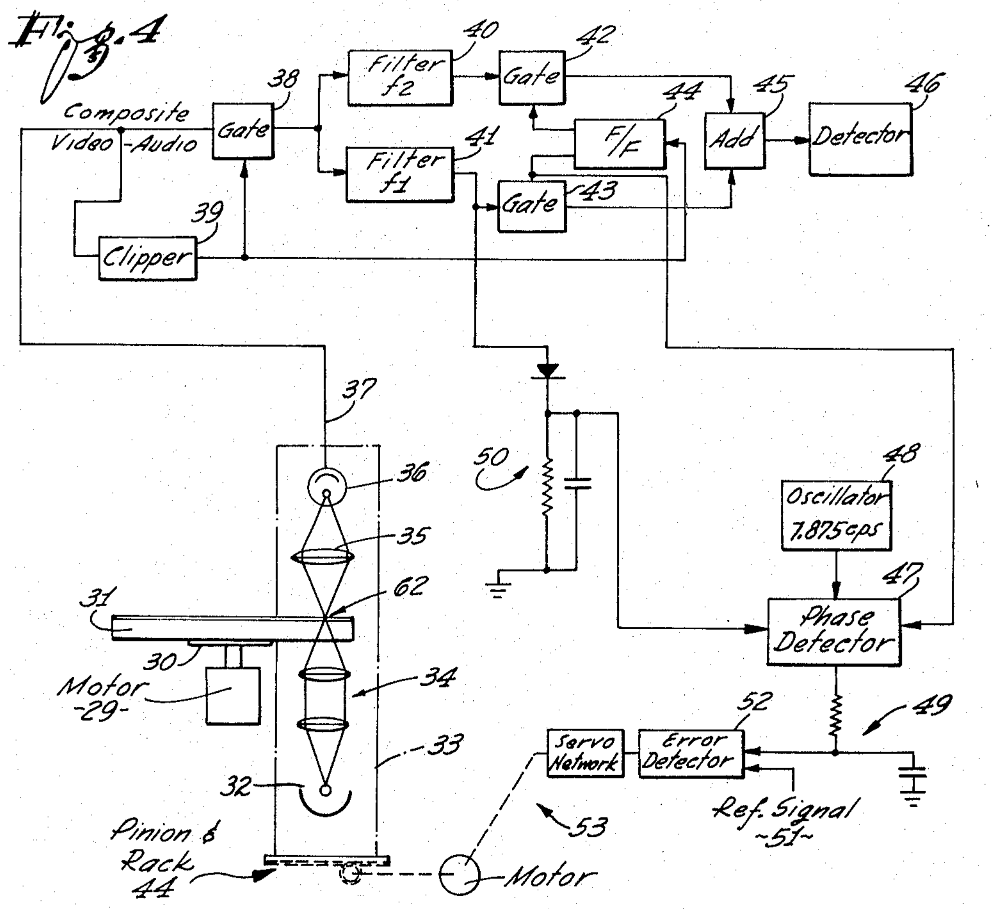
FIG. 4 illustrates somewhat schematically a block diagram for a play back or reproducing network using the audio information for tracking.

Proceeding now to the description of FIG. 4, there is shown a network which may be employed with advantage to sample the composite video and audio information of a record as produced by a network shown in FIG. 1 or FIG. 1*a*.

There is first shown a motor 29 driving a turntable 30 supporting a recording disk 31. There is next provided a light source 32 mounted in a detector housing 33. The light from source 32 is focused by a condenser system 34 into the plane of the recording layer proper of disk 31. The light spot resulting from the focusing action of condenser system 34 will be described more fully below. The recorded information of disk 31 modulates the intensity of the light as focused by condenser system 34, and the modulated light beam is being picked up by a lens 35 imaging the modulated light spot into a photoelectric receiver 36. The output of photoelectric receiver 36 is fed to a line 37 receiving an electrical signal, which includes a composite video-and-audio signal, whenever the light spot observed by lens 35 is guided along a recording track produced as was outlined in connection with FIG. 1, The composite video-audio signal of line 37 is fed to the main input terminal of a gate 38, preferably having linear transmission characteristics within the entire amplitude and frequency range of this composite signal. A clipping circuit 39 is connected to line 37 so as to receive the composite signal, but separating therefrom the horizontal control pulses. These latter pulses are fed as gating signals to the gating terminal of gate 38. The operation of the two elements 38 and 39 results in the production of output pulses at the output terminal of gate 38, occurring at the rate of the horizontal control pulses modulated with either the carrier $f_1$ or the carrier $f_2$, which carriers, in turn, are frequency-modulated by the audio signal. All these signals have been picked up by the photoelectric receiver 36 in view of the above-described recording.

The output of gate 38 is being fed to two filters 40 and 41; filter 40 permits passage only of carrier signals $f_2$, whereas filter 41 permits only the passage of oscillations having the frequency $f_1$. Two gates, 42 and 43, have their signal input terminals connected to filters 40 and 41, respectively; the signal output terminals of gates 42 and 43 are being combined at an adding network 45.

The two gating terminals of gates 42 and 43 are respectively connected to the two different output terminals of a flip-flop 44, which is of the single input type and has its input terminal connected to clipper 39. Accordingly, flip-flop 44 alternates its switching state upon occurrence of each horizontal control pulse, so that the two gates 42 and 43 are alternatingly opened and closed.

The output signal of adding network 45 is fed to an FM detector operating at both carriers and having as its output the audio signal proper.

It thus appears that, upon occurrence of any horizontal control pulse, either gate 42 or gate 43 is being opened, and the audio signal modulated with either frequency $f_2$ or frequency $f_1$ is being detected for purposes of sound reproduction. However, gate 38 is open only for the duration of the sync or blanking pulse, so that no signals are being demodulated outside of the sync or blanking periods.

Before proceeding to the description of the tracking circuit network and the tracking control, the specific location of the detecting light spot as produced by condenser system 34 is to be described with particular reference to FIG. 5. Again there are shown two parallel track portions I and II, with two aligned horizontal blanking-pulse recording areas "A" and "B." The two tracks I and II are very close because juxtaposed track portions pertain to the same line of two succeeding frames. Tracks I and II are, of course, contiguous because the entire track forms a spiral. The video content of the same line of two succeeding frames is not materially different from each other, so that a strict separation between two parallel track portions is not essential. In other words, the two track portions can be positioned very close together. Moreover, it is quite permissible to employ a light spot for video signal detection which is not confined to a single track, but extends beyond the border of one particular track into the region of the neighboring track. Such a light spot is shown in FIG. 5 and designated therein by reference numeral 62. It is shown in particular that the light spot 62 is located to cover by about one-half of its extension one track, and the remaining half of the light spot extends into the neighboring track. The moment illustrated shows the light spot 62 on areas "A" and "B." That is to say, at that particular moment the entire network is operating to detect horizontal blanking and sync signals as well as audio recordings.

As was said above, the area "A" is to contain audio-modulated carrier $f_1$ information, so that area "B" contains audio content with $f_2$ as carrier frequency. The areas "A'" and "B'" follow next as horizontal blanking-pulse recordings along the two track portions. Accordingly, track portion "A'" contains recordings of carrier $f_2$, and track portion "B'" contains recordings of carrier $f_1$, because in one and the same contiguous track portion the recorded carrier frequency is being alternated as between two succeeding horizontal blanking periods.

The photoelectric receiver 36 shown in FIG. 4 will detect a composite signal including both $f_1$ and $f_2$ as carriers. The D.C. level of the entire signal momentarily detected is that of the horizontal sync pulse, because area "A" as well as area "B" represents horizontal blanking and sync pulses for the video signal. The composite $f_1$ and $f_2$ signal, as passing through gate 38, is being divided by filters 40 and 41 into two components of equal strength, provided light spot 62 is in fact in the position shown in FIG. 5. By virtue of proper initial synchronization, it shall be assumed that gate 43 is open and gate 42 is closed, so that the audio detector 46 receives only audio-modulated signals at carrier frequency $f_1$. In case light spot 62 deviates from its prescribed path along the tracks, the signal at carrier frequency $f_1$ will be stronger or weaker. Looking again at FIG. 5, it appears that a position of light spot 62 more to the left produces a stronger $f_1$ signal, while a position more to the right produces a weaker signal at carrier frequency $f_2$. This effect can be used for purposes of tracking. Light spot 62 is on its proper tracking path whenever the center of the spot runs along the boundary extending between track portions I and II.

When the light spot 62 later on passes over the next blanking-pulse recording areas "A'" and "B'," with an $f_2$ carrier signal recorded in "A'" and an $f_1$ carrier signal recorded in "B'," any deviation of spot 62 from the above-defined tracking path results in opposite amplitude deviations of the two carrier signals. Accordingly, when the spot 62 progresses along the tracking path, the amplitude of the $f_1$ and the $f_2$ signals, as measured at blanking- and sync-pulse levels and as developed at the output sides of filters 40 and 41, will wobble at half the line frequency and in opposite phase relationship to each other. The amplitude of this wobble oscillation represents directly the extent of the deviation of light spot 62 from the proper tracking path.

FIGS. 5*a* and 5*b*, respectively, illustrate the amplitude of the signals developed at the output side of filters 40 and 41, respectively, whenever light spot 62 deviates from the proper tracking path. The rate of occurrence of each individual pulse as illustrated corresponds, of course, to the line frequency of 15.75 kilocycles, while the wobble frequency is 7.875 kilocycles. The fundamental of the wobble oscillation is plotted as a dash-dot line in FIG. 5*a*.

The output side of filter 41 is fed to an envelope detector 50, receiving signals plotted in FIG. 5*a* occurring only during the horizontal control pulses and eliminating any of the carriers $f_1$ and $f_2$ therefrom. The output of envelope detector 50 is fed to a phase detector 47 operating at 7.875 kilocycles per second and receiving a reference signal from an oscillator 48 producing reference oscillations at 7.875 kilocycles per second. The oscillations of oscillator 48 are phase shifted so that maxima and minima occur in between two succeeding sync pulses (dotted curve in FIG. 5*a*). Phase detector 47 enables the network to distinguish between the tracks as well as to determine the direction of the deviation of spot 62 from the proper tracking path. At any specific moment of tracking, there will occur signals at carrier frequency $f_1$ and at carrier frequency $f_2$ for each horizontal control pulse, even though such signals are being drawn alternatingly from parallel tracks. If the spot 62 deviates from its desired tracking path, the $f_1$ and $f_2$ signals will wobble at a frequency of 7.875 kilocycles, but with respective positive and negative phase shifts of 90° relative to the reference oscillations.

It will be observed that for the spot deviation, the particular effect of which is being shown in FIG. 5*a*, there is a leading phase shift of 90° relative to the reference oscillation, while the wobble oscillation of the $f_2$ signals has a lagging phase shift of 90° relative to the reference oscillation shown in dotted curve. A deviation of spot 62 in an opposite direction would result in wobble oscillations having correspondingly oppositely directed phase deviations from the reference oscillation. Since the phase deviations of $f_1$ and $f_2$ produce similar results, only one wobble oscillation, for example, that of $f_1$, is needed for tracking. The polarity of the detector output representing the phase shift between the $f_1$ signals and the reference oscillation is, therefore, indicative of the direction of the deviation of light spot 62 from the desired tracking path.

Flip-flop 44 has one of its output terminals also connected to phase detector 47. The connection is being made so that phase detector 47 is being enabled only during the period of time in which gate 43 is being gated-open, so that only pulses "*a*" and "*b*," etc., are being evaluated. In this way it is insured that the phase detector output represents direction as well as magnitude of the deviation of light spot 62 from the desired tracking path.

It thus appears that the output signal pulses drawn from phase detector 47 have a pulse rate frequency of 7.875 kilocycles, which is amplitude modulated. A low-pass filter 49 is connected to the output side of phase detector 47, and an error signal detector 52 receives the output signal of filter 49. The D.C. signal fed to error signal detector 52 is variable in magnitude in that a decrease or increase measured from a particular level indicates deviation of spot 62 from the proper tracking path. The error signal detector 52 receives the D.C. output passed through filter 49 as well as a reference signal 51, so that output zero of error signal detector 52 represents the proper position of light spot 62 along its tracking path. Whenever an error signal occurs, it is being fed to a servo control 53 driving a rack-and-pinion arrangement 54 to adjust detector housing 33 radially in relation to turntable 30 and record 31. Since light spot 62 faithfully follows the movement of detector housing 33, the network as described provides a complete feed-back control system. However, this feed-back control system will preferably be used only for fine control of tracking, and a coarse tracking control which includes servo system 53 may be provided additionally, in a manner as, for example, disclosed in the copending application of D. L. De Moss et al., Ser. No. 217,408, filed Aug. 16, 1962, and assigned to the same assignee.

In FIG. 6, there is shown a different type of tracking operable with similar advantage. In this embodiment, composite video-audio signal output line 37 also connects to a gate 38 and a clipper 39 cooperating as aforedescribed. Also, filters 40 and 41 receive the signal permitted to pass through gate 38; and the two gates 42 and 43, respectively, govern the delivery of output signals from filters 40 and 41, respectively, to adding network 45 and FM detector 46, which includes an audio demodulator. There is also provided a flip-flop 44, which alternatingly opens gate 42 and gate 43 upon occurrence of horizontal sync pulses at the output side of clipper 39.

Thus far, the network corresponds to that described with reference to FIG. 4. In addition, there is provided another gate 55 having its gating terminal connected to flip-flop 44 in such a manner that gates 43 and 55 are being opened concurrently. The main input terminal of gate 55 is connected to filter 40 so that gate 55 governs passage of signals at carrier frequency $f_2$. It will be observed that signals at carrier frequency $f_2$ will pass through gate 55 whenever signals at frequency $f_1$ pass through gate 43 and into detector 46.

For purposes of tracking and particularly for purposes of deriving a control signal for the fine control of tracking, the output signals developed at the output side of gates 43 and 55 are individually passed through low-pass filters 63 combined with envelope detectors, so that two continuous D.C. signals are being produced representing the relative magnitude of the sync-pulse carrier modulation at frequencies $f_1$ and $f_2$ as occurring during those time intervals during which audio detection is had at carrier frequency $f_1$. Since output signals are developed at gates 43 and 55 only during horizontal blanking periods, during any such period the ratio of the $f_1$ and the $f_2$ signal is directly proportional to the position of light spot 62 relative to the desired path of tracking. Accordingly, this ratio can be used directly in a D.C. network such as a ratio detector 56.

The two D.C. signals at the output sides of filter 63 are passed into a ratio detector 56 resulting in a composite D.C. output signal, which, in fact, is indicative of the position of the above-mentioned light spot 62 relative to adjoining tracks. This measuring signal is fed to an error detector 57 wherein it is compared with a D.C. reference signal. It will be observed that ultimately the magnitude of this D.C. reference signal determines the correct position for tracking of light spot 62 on the tracks.

In view of the foregoing description of light spot 62, it thus appears that the output of ratio detector 56 determines the extent of light spot 62 over two tracks. Whenever this ratio detector 56 produces unity as the output signal, the light spot will have equal areas on two adjoining tracks. The output signal of ratio detector 56 is used for the formation of an error signal which is being fed to driver 58 for fine control. Driver 58 is linked to a carriage 59 upon which is mounted a motor 29 driving turntable 30. The record disk 20 is scanned by a detector beam 60, and the modulation is being picked up by a detector 61 feeding the signal output line 37 as aforedescribed. The driver 58 and the error detector 57 may also include a coarse control network, as was mentioned above.

It should be mentioned that it is within the scope of the invention to have the tracking control operate in such a manner that proper tracking is present even if light spot 62 does not extend equally wide over two tracks. In this case, tracking requires that light spot 62 have its center running offset from the boundary between the two adjoining tracks I and II. For such a situation, ratio detector 56 develops a particular D.C. signal to be balanced by a D.C. reference signal which is different from the reference signal mentioned above and used when the center of light spot 62 runs along the above-defined boundary. In other words, suitable selection of the reference signal for the error detector 57 enables tracking along any path in relation to two adjoining track portions.

Proceeding now to the description of FIG. 7, there is shown a modified network for producing a composite video and audio recording and wherein in particular the carrier frequency is being alternated from frame to frame. In a manner similar to the network described with reference to FIG. 1, in FIG. 7 there is shown an audio source, such as a microphone or the like, designated by reference numeral 10 and being connected to the signal input terminals of two gates 11 and 12 governing the input of modulators 13 and 14 appropriately connected to oscillators 27 and 28. There is also shown a flip-flop 16 for governing the two gates 11 and 12. In this embodiment, however, the single input terminal of flip-flop 16 is connected through a two-to-one binary divider 68 to a generator 64 for the vertical sync signal. This connection insures that, for example, gate 11 is open for the entire period of one frame, while gate 12 is then opened for the respective next frame; and there are always two vertical sync pulses per frame.

The horizontal sync- or blanking-pulse generator 65 feeds additional gating pulses to gates 11 and 12, so that the adding member 66 receives the modulated carrier only during the horizontal sync-pulse or blanking-pulse period. The output of adder 66 is connected to the source 18 for the recording beam 19, as aforedescribed. Recording is being carried out otherwise, as was described with reference to FIG. 1.

FIG. 8 illustrates a modified network for read-out or play back. The composite video-and-audio signal is applied to the gate 38, which is gated-open by the horizontal control pulse as aforedescribed. In FIG. 8, there are also shown the two filters 40 and 41 having their outputs governed by gates 42 and 43 feeding the adding network 45. The gating terminals of gates 42 and 43 also connect to a flip-flop 44. However, in this embodiment, switching action of flip-flop 44 is controlled by a pulse source 78 to switch flip-flop 44 at every other vertical sync pulse, so that either gate 42 or gate 43 is open during reproduction of a complete frame. Pulse source 78 may be a divider, such as 68 in FIG. 7, to be connected to detector 61 to respond to the detected vertical sync pulses occurring at field rate. Alternatively, source 78 may be a 15 c.p.s. astable square wave oscillator, also connected to respond to the detected vertical sync signal, but this oscillator will ignore every other vertical sync pulse and trigger only at frame rate. Such an oscillator could also be used in the recording network shown in FIG. 7 and in lieu of divider 68.

The network shown in FIG. 8 also illustrates a modified tracking control system and method. The output signals as developed at the output sides of filters 40 and 41 are individually fed to rectifiers 70 and from there through low-pass filters 71 into a D.C. error detector 72. It will be observed that in case of proper tracking, i.e., light spot 62 covering precisely two tracks with equal distribution of scanning-spot areas on both sides, the D.C. signals fed to error detector 72 have equal magnitude. Since the output side of each individual rectifier or envelope detector 70 constitutes a train of D.C. pulses, after appropriate smoothing, these pulses are capable of comparison in a D.C. network. Accordingly, error detector 72 forms the difference of the two output signals derived from rectifiers 70 through filters 71. The resulting error signal will be a D.C. voltage having a polarity which corresponds to the direction of deviation of spot 62 from the desired tracking path.

However, for any particular spot deviation, the error signal developed in detector 72 will reverse its polarity after every other vertical sync pulse in view of the fact that the carrier frequencies $f_1$ and $f_2$ had been alternated from frame to frame for the audio recording.

In order to insure that the polarity of the error signal will not be altered from frame to frame, the error signal output is being fed to the signal input terminals of two gates 73 and 74. The gates 73 and 74 have their gating terminals respectively connected to the two output sides of flip-flop 44, so that the two gates 73 and 74 will be alternatingly opened and closed from frame to frame.

The signal output terminal of gate 73 connects directly to the input side of a servo network 75, so that the error signal from detector 72 is being fed directly to the servo network whenever gate 73 is open. The signal output terminal of gate 74 connects to an inverter stage 76 having its output side connected to the input side of servo network 75. Accordingly, when gate 74 is being opened, the error signal developed by error detector 72 is reversed in its polarity before utilization in servo network 75. Accordingly, for a given error and tracking deviation, the polarity of the error signal developed by detector 72 alternates from frame to frame, but the servo network 75 receives a unidirectional error signal.

Servo network 75 operates upon a driver 77 for radially advancing carriage 59 as aforedescribed.

The invention is not limited to the embodiments described above, but all changes and modifications thereof not constituting departures from the spirit and scope of the invention are intended to be covered by the following claims.

What is claimed is:

1. A system for concurrently recording video and audio information, the combination comprising:

a storage disk;

means for recording an odd number of video frames on said disk along a spiral track portion of 360° arc length;

a generator for horizontal control pulses for the video signal;

a source of audio signals; and means connected to said pulse generator and to said source of audio signals for processing the audio signals to obtain recording signals in which the audio signals are represented by one of a plurality of different characteristics and means for feeding said recording signals to said recording means for inscribing them on said disk in portions of said spiral track allotted for recording of said control pulses so that recording signals recorded in juxtaposed control pulses on neighboring portions of the spiral track have the audio represented by different ones of said characteristics of the plurality.

2. A system for recording video and audio information on a storage disk, there being means for inscribing a spiral recording track on said disk, the combination comprising:

means for feeding a video signal to said inscribing means;

a generator for horizontal control pulses for a video signal;

means for processing the audio signals to provide recording signals in accordance with a plurality of different characteristics, one at a time;

means for providing the recording signals to the inscribing means during concurrent recording with the control pulses so that recording signals recorded with control pulses juxtaposed in neighboring portions of the track have different characteristics of the plurality.

3. A system for recording video and audio information on a storage disk in a spiral track thereon, and wherein one video frame or an odd-numbered multiple of frames is recorded on a spiral track portion of 360° arc length, the combination comprising:

a generator for horizontal control pulses for a video signal;

a source of audio signals;

a first and a second modulator for modulating a first and a second carrier, respectively, with audio signals;

means connected for having said first and second modulators alternatingly modulating the audio signals from said source in synchronism with the occurrence of said control pulses and for the duration thereof; and means for inscribing the audio-modulated signals in portions of the track allotted for recording said control pulses.

4. A device for recording video and audio information in a contiguous track on a rotating storage carrier, comprising:

means for generating a train of horizontal control pulses for a video signal;

means for alternatingly modulating two different carrier frequencies at occurrence and for duration of said horizontal control pulses with audio signals;

means for recording video signals on said storage carrier; and means for recording said alternatingly modulated carriers during periods of time allotted for the recording of said horizontal control pulses.

5. A system for controlling tracking of a detector beam to be modulated by characteristics of a recording disk and to be guided along a spiral track corresponding to a spiral recording track defined by a recorded composite video-and-audio signal, with the audio signals being recorded in track portions, with adjoining track portions of neighboring tracks containing audio information at two different carriers, the combination comprising:

means including the detector beam for concurrently detecting the information along two adjoining tracks;

means connected to said detecting means and being responsive to the relative strength of one carrier signal and producing an output corresponding thereto; and means for controlling the relative movement of detector beam and disk in response to said output.

6. A system for controlling tracking of a detector beam to be modulated by characteristics of a recording disk and to be guided along a spiral track corresponding to a spiral recording track defined by a recorded composite video-and-audio signal, with the audio signals being recorded in track portions, with adjoining track portions of neighboring tracks containing audio information at two different carriers, the combination comprising:

means including the detector beam for concurrently detecting the information along two adjoining tracks;

means connected to said detecting means and being responsive to the relative magnitude of one carrier signal and producing an output corresponding thereto;

filter means for separating the two carriers; an envelope detector connected to one of said filter means; a reference network connected to said envelope detector and producing an output responsive to the relative magnitude of one carrier frequency; and means for controlling the relative movement of detector beam and disk in response to said output.

7. In a system for controlling tracking of a detector beam during reproduction of information recorded on a storage carrier in a continuous track thereon having parallel track sections, and wherein FM modulated audio signals are recorded in track portions with adjoining track portions of neighboring track sections containing the audio information at two different carrier frequencies, the combination comprising:

means responsive to amplitude modulations of said detector beam at the two different frequencies and producing an output indicative of said amplitude modulation; and means for controlling the relative movement of detector beam and storage carrier in response to said output.

8. In a system for controlling tracking of a detector beam during reproduction of information recorded on a storage carrier in a continuous track thereon having parallel track sections, and wherein FM modulated audio signals are recorded in track portions with adjoining track portions of neighboring track sections containing the audio information at two different carrier frequencies, the combination comprising:

means individually responsive to one of the two carrier frequencies as detected by the detector beam;

means responsive to an amplitude modulation of said one carrier frequency at half the frequency of the rate of occurrence of said track portions, and producing an output corresponding thereto; and means for controlling the relative movement of detector beam and storage carrier in response to said output.

9. In a system for controlling tracking of a detector beam along a continuous recording track on a storage carrier, the track having parallel track sections, during reproduction of the information recorded on such a track, which information comprises video signals and FM modulated audio signals recorded in track portions allotted for recording the horizontal control-pulse signals, with adjoining track portions of neighboring track sections containing the audio information at two different carrier frequencies, the combination comprising:

gating means connected to be responsive to electrical signals resulting from said detector beam; means for gating said gating means open upon occurrence of said horizontal control-pulse signals;

means individually responsive to the two carrier frequency signals as detected by the detector beam;

means for detecting the ratio of the two responded signals and producing a common output; and means for controlling the relative movement of detector beam and storage carrier in response to said output.

10. In a system for controlling tracking of a detector beam along a continuous recording track on a storage carrier, the track having parallel track sections, during reproduction of the information recorded on such a track, which information comprises video signals and FM modulated audio signals recorded in track portions allotted for recording the horizontal control-pulse signals, with adjoining track portions of neighboring track sections containing the audio information at two different carrier frequencies, the combination comprising:

gating means connected to be responsive to electrical signals resulting from said detector beam; means for gating said gating means open upon occurrence of said horizontal control-pulse signals;

means individually responsive to one of the two carrier frequencies as detected by the detector beam;

means responsive to an amplitude modulation of said one carrier frequency at half the frequency of the rate of occurrence of said track portions, and producing an output corresponding thereto; and means for controlling the relative movement of detector beam and storage carrier in response to said output.

11. A system for recording video and audio information on a rotating storage carrier in a contiguous track thereon, and wherein one video frame or an odd-numbered multiple of frames is recorded on parallel track portions, the combination comprising:

a control pulse generator; an audio signal source; and audio modulator means alternatingly connected to said audio source to provide alternatingly different audio modulated signals; a video signal source;

controllable means connected to said video signal source for inscribing an information signal track on said storage carrier characteristic of a composite video signal; and means connected to said generator for connecting said audio signal modulator means to said controllable means for the duration of the control pulses as derived from said generator, the modulated signals as provided alternate as between respective sequential ones of the control pulses.

12. A system for recording video and audio information on a storage disk, the combination comprising:

means for inscribing a video recording on said disk along a spiral whereby an odd number of frames is recorded on a spiral track portion of 360° arc length;

a generator for horizontal control pulses for the video signal;

a source of audio signals;

a first and a second gated modulator network connected to said audio signal source and said generator for producing audio-modulated carriers alternatingly at a first and a second carrier frquency, respectively, and upon occurrence of said control pulses; and means for feeding said alternatingly modulated carriers to said inscribing means for recording said audio-modulated carriers during said control pulses.

13. A system for recording information on a rotating storage carrier, there being a generator for horizontal control pulses for a video signal, the combination comprising:

means for inscribing a contiguous recording track on said rotating storage carrier, with an odd number of said horizontal video control pulses being recorded during one complete carrier revolution;

a source of audio signals;

two sources of two carrier frequencies;

means connected for alternatingly modulating said two carrier frequencies at occurrence and for duration of said horizontal control pulses; and means for feeding said modulated carriers to said inscribing means for recording during said control pulses.

14. In a system for reproducing information stored on a disk in a continuous spiral recording track thereon, which information comprises video signals and audio signals recorded in track portions allotted for recording horizontal control signals, with adjoining track portions of neighboring track sections containing the audio information at two different carrier frequencies, the combination comprising:

detector means responsive to said stored video and audio signals and producing an electrical signal representative thereof; and means connected to said detector means and being alternatingly responsive to said carrier frequencies upon occurrence of said recorded horizontal control signals.

References Cited

UNITED STATES PATENTS

| | | | |
|---|---|---|---|
| 2,350,902 | 6/1944 | Kallman | 178—5.6 |
| 2,671,130 | 3/1954 | Weighton | 178—5.6 |
| 3,157,739 | 11/1964 | Okamura | 178—6.6 |
| 3,159,711 | 12/1964 | Schut | 178—6.6 |

ROBERT L. GRIFFIN, *Primary Examiner.*

JOHN W. CALDWELL, *Examiner.*

H. W. BRITTON, *Assistant Examiner.*